US009444853B2

(12) United States Patent
Gaucas

(10) Patent No.: US 9,444,853 B2
(45) Date of Patent: Sep. 13, 2016

(54) METHOD AND APPARATUS FOR MONITORING ACCESS OF PRE-READ MATERIALS FOR A MEETING

(71) Applicant: Xerox Corporation, Norwalk, CT (US)

(72) Inventor: Dale Ellen Gaucas, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 581 days.

(21) Appl. No.: 13/897,108

(22) Filed: May 17, 2013

(65) Prior Publication Data
US 2014/0344355 A1 Nov. 20, 2014

(51) Int. Cl.
*H04L 29/06* (2006.01)
*G06Q 10/00* (2012.01)
*G06Q 10/10* (2012.01)
*H04L 12/18* (2006.01)
*H04L 29/08* (2006.01)

(52) U.S. Cl.
CPC ........... *H04L 65/1063* (2013.01); *G06Q 10/10* (2013.01); *G06Q 10/103* (2013.01); *G06Q 10/107* (2013.01); *G06Q 10/109* (2013.01); *H04L 12/1818* (2013.01); *H04L 67/22* (2013.01); *H04L 2209/42* (2013.01)

(58) Field of Classification Search
CPC ................ G06F 21/6209; G06F 17/30011; G06F 21/62; G06F 2003/0697; G06F 21/32; G06F 21/645; G06F 2221/2101; G06F 3/0601; G06F 17/30247; G06F 17/30864; G06F 17/30884; G06F 17/30899; G06F 17/30991; G06Q 10/109; H04L 9/3247; H04L 2209/56
USPC ......... 709/204, 209; 707/E17.008, 705, 758, 707/E17.01, E17.014, E17.032, 663, 722, 707/780, 999.01, 999.1, 999.103, 999.203, 707/999.204
See application file for complete search history.

(56) References Cited

U.S. PATENT DOCUMENTS

| 7,523,385 B2 * | 4/2009 | Nguyen | G06Q 10/02 705/5 |
| 2004/0049571 A1 * | 3/2004 | Johnson | G06Q 10/10 709/224 |
| 2007/0174347 A1 * | 7/2007 | Wenn | G06F 17/30011 |
| 2008/0147469 A1 * | 6/2008 | Murillo | G06Q 10/1095 705/7.19 |
| 2008/0195312 A1 * | 8/2008 | Aaron | G06Q 10/109 455/418 |
| 2009/0030766 A1 * | 1/2009 | Denner | G06Q 10/06 705/7.15 |
| 2009/0070678 A1 * | 3/2009 | Landar | G06Q 10/109 715/733 |
| 2009/0248808 A1 * | 10/2009 | Izumi | G06Q 10/107 709/206 |
| 2010/0131523 A1 * | 5/2010 | Yu | G06Q 10/107 707/756 |
| 2011/0161362 A1 * | 6/2011 | Lipscombe | G06F 17/30011 707/769 |
| 2011/0197166 A1 * | 8/2011 | Girgensohn | G06F 17/30943 715/846 |
| 2012/0254348 A1 * | 10/2012 | Chaturvedi | H04L 67/10 709/217 |
| 2012/0278700 A1 * | 11/2012 | Sullivan | G06F 17/218 715/235 |

(Continued)

FOREIGN PATENT DOCUMENTS

JP 2002123452 A * 4/2002

*Primary Examiner* — Patrice Winder
*Assistant Examiner* — Abderrahmen Chouat

(57) ABSTRACT

A method, non-transitory computer readable medium, and apparatus for monitoring access of a pre-read material for a meeting are disclosed. For example, the method receives a request to monitor access of the pre-read material for the meeting, creates a document that records an access history of the pre-read material by each one of one or more invited attendees in accordance with one or more parameters specified in the request, updates the document each time the pre-read material is accessed by one of the one or more invited attendees and provides the document to a meeting requestor.

17 Claims, 5 Drawing Sheets

(56) References Cited

U.S. PATENT DOCUMENTS

| | | | |
|---|---|---|---|
| 2013/0024437 A1* | 1/2013 | Stevens | G07C 5/085 707/705 |
| 2013/0179495 A1* | 7/2013 | Eom | G06F 9/5072 709/203 |
| 2013/0238783 A1* | 9/2013 | Alexander | G06F 17/30873 709/224 |
| 2013/0290477 A1* | 10/2013 | Lesage | H04L 67/34 709/217 |
| 2014/0229449 A1* | 8/2014 | Sanaullah | G06F 17/30303 707/690 |

* cited by examiner

METHOD AND APPARATUS FOR MONITORING ACCESS OF PRE-READ MATERIALS FOR A MEETING

The present disclosure relates generally to improving productivity and efficiency of meetings and, more particularly, to a method and an apparatus for monitoring access of pre-read materials for a meeting.

BACKGROUND

In corporate environments, meeting requests often include one or more pre-read materials. The meeting requestor may include the pre-read materials so that invited attendees may read the materials to prepare for the scheduled meeting. By reading the materials, the attendees may be fully prepared to engage in discussions and contribute to an agenda for the scheduled meeting.

However, many times the invited attendees do not read or review the included pre-read materials in the meeting request. As a result, the scheduled meeting becomes ineffective or inefficient as the attendees are not prepared to discuss the agenda. This can result in possibly having to reschedule the meeting or simply having an ineffective meeting that wastes everyone's time.

SUMMARY

According to aspects illustrated herein, there are provided a method, a non-transitory computer readable medium, and an apparatus for monitoring access of a pre-read material for a meeting. One disclosed feature of the embodiments is a method that receives a request to monitor access of the pre-read material for the meeting, creates a document that records an access history of the pre-read material by each one of one or more invited attendees in accordance with one or more parameters specified in the request, updates the document each time the pre-read material is accessed by one of the one or more invited attendees and provides the document to a meeting requestor.

Another disclosed feature of the embodiments is a second method for monitoring access of a pre-read material for a meeting that creates a meeting invite message including one or more meeting request parameters defined by a meeting requestor, wherein the one or more meeting request parameters comprise one or more invited attendees, a date, a time, a pre-read material for the meeting and one or more monitoring parameters for monitoring an access history of the pre-read material by each one of the one or more invited attendees, sends the meeting invite message to a calendar application server for forwarding the one or more monitoring parameters to a monitoring agent of a document repository server where a document for recording an access history of the pre-read material by each one of the one or more invited attendees is created in accordance with the one or more monitoring parameters and receives the document.

Another disclosed feature of the embodiments is a third method for monitoring access of a pre-read material for a meeting that receives a meeting invite message including one or more meeting request parameters defined by a meeting requestor, wherein the one or more meeting request parameters comprise one or more invited attendees, a date, a time, a pre-read material for the meeting and one or more monitoring parameters for monitoring an access history of the pre-read material by each one of the one or more invited attendees, sends the meeting invite message to each one of the one or more invited attendees and sends a request to monitor access of the pre-read material for the meeting to a monitoring agent of a document repository server where a document for recording an access history of the pre-read material by each one of the one or more invited attendees is created in accordance with the one or more monitoring parameters, wherein the request includes the one or more monitoring parameters.

Another disclosed feature of the embodiments is a non-transitory computer-readable medium having stored thereon a plurality of instructions, the plurality of instructions including instructions which, when executed by a processor, cause the processor to perform any one of the methods for monitoring access of a pre-read material for a meeting described herein.

Another disclosed feature of the embodiments is an apparatus comprising a processor and a computer readable medium storing a plurality of instructions, which when executed by a processor cause the processor to perform operations, the operations comprising any one of the methods for monitoring access of a pre-read material for a meeting described herein.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method and non-transitory computer readable medium for monitoring access of a pre-read material for a meeting. As discussed above, meeting requests often include one or more pre-read materials. The meeting requestor may include the pre-read materials so that invited attendees may read the materials to prepare for the scheduled meeting. However, many times the invited attendees do not read or review the included pre-read materials in the meeting request. As a result, the scheduled meeting becomes ineffective or inefficient as the attendees are not prepared to discuss the agenda. The term "pre-read material" is broadly used to encompass a material that is enclosed (or a link to a repository) with a meeting request.

One embodiment of the present disclosure provides a method to allow a meeting requestor to monitor access of the pre-read materials for a scheduled meeting. For example, the meeting requestor may monitor whether or not each one of the invited attendees having accessed the pre-read materials.

As a result, the meeting requestor can use the information to decide whether the meeting needs to be rescheduled due to a low number of attendees accessing (presumably reviewing) the pre-read materials, whether a follow up with the invited attendees is needed to remind them to review the pre-read materials, and the like.

Figure 1:
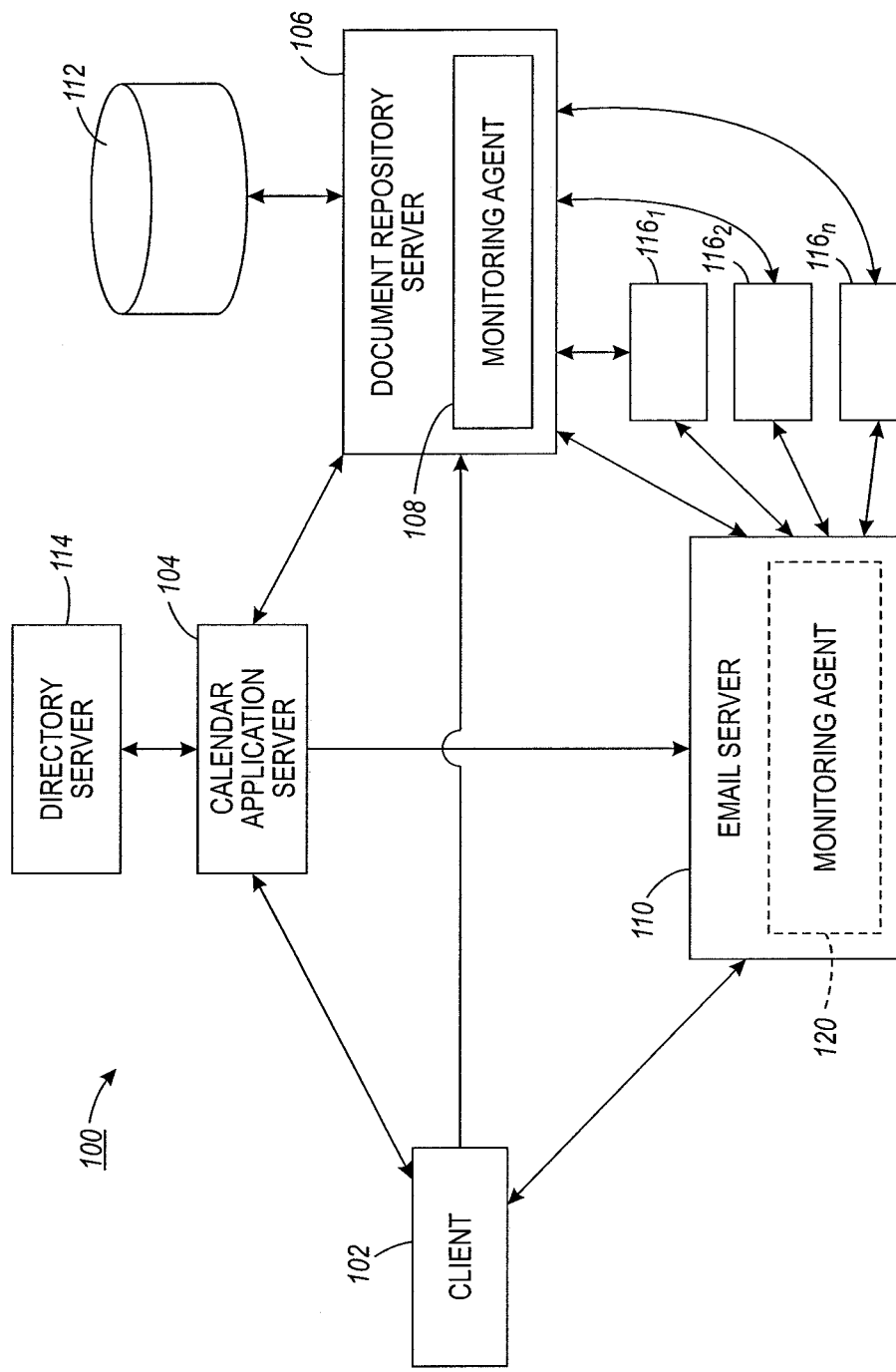
FIG. 1 illustrates one example of a communication architecture for monitoring access of a pre-read material for a meeting.

To better understand the present disclosure, FIG. 1 illustrates an example of a communications architecture 100 for monitoring access of a pre-read material for a meeting. In one embodiment, the communications architecture 100 may include a software client 102, a calendar application server 104, a document repository server 106, an email server 110, a document repository 112, a directory server 114 and one or more clients $116_1$ to $116_n$ (also referred to collectively as clients 116).

Figure 5:
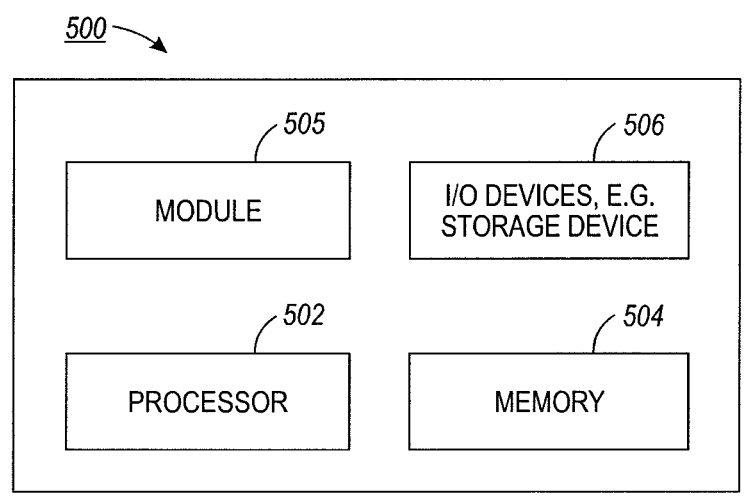
FIG. 5 illustrates a high-level block diagram of a general-purpose computer suitable for use in performing the functions described herein.

In one embodiment, the client 102 may be a calendar application or meeting application running on a computing device of a meeting requestor (e.g., Outlook®). The computing device may be a desktop computer, a laptop computer, a smart phone, and the like. In one embodiment, the computing device may be deployed as a general purpose computer as illustrated in FIG. 5 and described below.

In one embodiment, the meeting requestor may request a meeting by creating a meeting invite message at the client 102. The meeting invite message may include one or more invited attendees associated with a respective one of the clients 116. The clients 116 may also be a software client running on a computing device, such as for example, a desktop computer, a laptop computer, a smart phone, and the like. In one embodiment, the computing device for the clients 116 may be deployed as a general purpose computer as illustrated in FIG. 5 and described below.

In one embodiment, the meeting requestor may also include one or more pre-read materials in the meeting invite message for the invited attendees to review before the meeting begins. In one embodiment, the one or more pre-read materials may be a document or a file (e.g., a report, a spreadsheet, a slide presentation, a word processing document, a chart, a graph, a picture, an image, a video, and the like) or a link to the document in the document repository 112.

Previously, there was no way for the meeting requestor to monitor whether or not the pre-read materials were being accessed by the invited attendees before the meeting began. As a result, the meeting would be inefficient or unproductive if a majority of the invited attendees did not review the pre-read materials and were unprepared.

However, one embodiment of the present disclosure allows the meeting requestor to include a monitoring request and one or more monitoring parameters as part of the meeting invite message. The monitoring parameters may define how an access history of the pre-read materials is monitored for each one of the invited attendees.

In one embodiment, the monitoring parameters may include tracking a percentage of invited attendees that have accessed the pre-read material. For example, if there are ten invited attendees, the monitoring parameters may track how many of the ten invited attendees have accessed (e.g., opened the document electronically, printed the document, etc.) and report a percentage.

In another embodiment, the monitoring parameters may include tracking a percentage of the invited attendees that have downloaded the pre-read materials, tracking a percentage of the invited attendees that have edited the pre-read material or tracking a percentage of invited attendees that have commented on the pre-read material. The percentages may be calculated as described above for the percentage of invited attendees that have accessed the pre-read material.

In another embodiment, the monitoring parameters may specify how information should be presented to the meeting requestor (e.g., in a bar chart, in a pie chart, in a graphical form, in a spreadsheet form, etc.). The monitoring parameters may also specify a delivery preference for the document or a time period for monitoring. For example, the meeting requestor may specify whether they would like to have the information sent via email, text message, and the like. In addition, the meeting requestor may specify a time period when the information should be sent. For example, the meeting requestor may specify updates per a time period basis, e.g., every day, every week, every month, and so forth. In one embodiment, the meeting requestor may specify that a final update may be sent the day before the scheduled meeting. The monitoring may be performed continuously during the time period from the date the meeting invite message is sent until the day of the scheduled meeting. As a result, the information may be continuously updated for the meeting requestor as the access of the pre-read material is monitored.

In one embodiment, the monitoring parameters may include a threshold. For example, the meeting requestor may require that at least 50% of the invited attendees access the pre-read materials otherwise the meeting should be rescheduled or canceled.

In one embodiment, the monitoring may be performed while maintaining privacy of each one of the invited attendees. For example, the various types of tracking that can be performed, as noted above, can be performed anonymously. As a result, the meeting requestor does not know an identity of which invited attendee has or has not accessed the pre-read materials. Rather, the meeting requestor is only provided with an overall percentage value or a numerical value. In other words, the identity of each one of the one or more invited attendees is hidden from the access history that is recorded during the monitoring.

By protecting the privacy of the invited attendees, the monitoring may be more accurate. For example, to avoid individual reprimand each invited attendee may simply open and close the document without review to show that they "accessed" the pre-read materials. However, if they remain anonymous during the monitoring, the invited attendees may behave normally without trying to "trick" the monitoring. Thus, the tracking percentages may provide a more accurate reflection of which invited attendees have actually accessed the pre-read materials.

In one embodiment, the meeting invite message may also include one or more meeting request parameters. In one embodiment, the meeting request parameters may include, for example, one or more invited attendees, a date of the meeting, a time of the meeting, a pre-read material as noted above and one or more monitoring parameters for monitoring an access history of the pre-read material by each one of the one or more invited attendees as noted above.

The meeting invite message may then be sent from the client 102 to the calendar application server 104. In one embodiment, the calendar application server 104 may be deployed as a general purpose computer illustrated in FIG. 5 and discussed below.

In one embodiment, the calendar application server 104 may look up the email address or contact information of each one of the invited attendees in the directory server 114. In addition, the directory server 114 may be used to look up document repository account names for each one of the one or more invited attendees such that the access to documents in the document repository 112 can be monitored. In one embodiment, the document repository account names may be the email address of the invited attendee. The calendar application server 104 may then forward the meeting invite message with the attached pre-read material to the email server 110, which may then email the meeting invite message to the clients 116 associated with each one of the invited attendees.

In one embodiment, the calendar application server 104 may detect that the meeting invite message includes a request to monitor access of the pre-read material and one or more monitoring parameters. In response, the calendar application server 104 may send a request to monitor access of the pre-read material to the document repository server 106 along with the one or more monitoring parameters.

In an alternative embodiment, the meeting invite message created by the client 102 may be sent directly to the document repository server 106 or the document repository 112 via an email. For example, the document repository server 106 and/or the document repository 112 may include an email interface. In one example, the meeting invite message may include the document repository server 106 as one of the "invited attendees".

In one embodiment, the document repository server 106 may include a dedicated document repository specific email server (e.g., Simple Mail Transfer Protocol (SMTP)) that receives messages from other mail servers (e.g., the email server 110) and stores them in the document repository 112 for subsequent processing. For example, there could be an email account on the dedicated document repository specific email server for monitoring report requests.

In another embodiment, the document repository server 106 may have a dedicated email account on a corporate email system and an email agent associated with the dedicated email account. For example, the email agent may poll an external mail server (e.g., Post Office Protocol 3 (POP3) or Internet Message Access Protocol (IMAP)) for messages addressed to the document repository server 106 that are monitoring report requests that are to be processed. For example, a specific subject or heading may be used for emails that are monitoring report requests.

In one embodiment, the document repository server 106 may be modified to include a monitoring agent 108. In one embodiment, the monitoring agent 108 may be a module executed by a processor of the document repository server 106. In one embodiment, the monitoring agent 108 may be deployed in a separate server or computer in communication with the document repository server 106. For example, the server or computer may be deployed as a general purpose computer illustrated in FIG. 5 and described below.

In one embodiment, the monitoring agent 108 may be spawned temporarily in response to the monitoring request. For example, the monitoring agent 108 may be spawned only for the time period for monitoring specified by the meeting requestor.

In one embodiment, the document repository server 106 may be in communication with a repository 112. In one embodiment, the repository 112 may be a database with storage that stores one or more documents. In one embodiment, the pre-read materials may include a link to one or more documents stored in the repository 112.

In one embodiment, when the monitoring agent 108 receives the request from either the calendar application server 104 or directly from the client 102, as described above, the monitoring agent 108 may create a document for recording the access history of the pre-read materials. For example, the document may be a word processing file, a spreadsheet file or a text file that lists each one of the pre-read materials included in the meeting invite message and each one of the invited attendees. Although the invited attendees are recorded for the monitoring, the final report or document sent to the meeting requestor will hide the identity of the invited attendees to protect their privacy as indicated above.

In one embodiment, as each one of the invited attendees accesses the pre-read material, the invited attendee may be opening a link to a document stored in the repository 112. As a result, the document repository server may know that a particular invited attendee has accessed the pre-read material and other information (e.g., a time of access, how long the document was opened, whether the document was edited, and the like). This information may then be recorded in the document created by the monitoring agent 108. The monitoring may be performed continuously as discussed above and the document may be continuously updated as additional invited attendees access the pre-read materials stored in the repository 112.

In one embodiment, the document created by the monitoring agent 108 may also be stored in the repository 112. As a result, the meeting requestor may request an update on-demand for the monitoring that is performed.

In one embodiment, when the monitoring is completed (e.g., based upon a time period for monitoring specified by the meeting requestor) a percentage or value for a monitoring parameter may be compared against a threshold for the same monitoring parameter. For example, if the monitoring parameter is tracking a percentage of invited attendees that have accessed the pre-read material, the percentage may be compared against a threshold for the percentage of invited attendees that have accessed the pre-read material (e.g., 75%).

This comparison may be used to determine if the calendar application server 104 should send a recommendation to the meeting requestor. For example, if the percentage is below the threshold, the calendar application server 104 may send a recommendation to the meeting requestor to cancel the meeting and/or reschedule the meeting for another date and time. In one embodiment, if the meeting requestor decides to cancel and/or change the meeting date and time, the calendar application server 104 may automatically update the meeting date and time and send out an updated meeting invite message to all of the invited attendees using the information contained in the original meeting invite message. In addition, the updated meeting invite message may contain a reminder to review the pre-read materials and notify the invited attendees that the reason the meeting was canceled and/or rescheduled was due to the fact that not enough of the invited attendees reviewed or accessed the pre-read materials.

In one embodiment, the comparison may be performed by the monitoring agent 108 and the results may be forwarded to the calendar application server 104. In another embodiment, the results of the monitoring may be forwarded to the calendar application server 104 and the comparison may be performed by the calendar application server 104.

In an alternative embodiment, a monitoring agent 120 may be spawned at the email server 110 instead of the document repository server 106. For example, if the pre-read material comprises the actual document rather than a link to a document in the document repository 112, the monitoring agent 120 at the email server may monitor whether an attached document in an email to the one or more invited attendees is opened, saved to disk, edited or saved. The email server 110 may then provide the access history information to the calendar application server 104 for processing and providing to the client 102 upon request, similar to the embodiments indicated above.

Thus, one embodiment of the present invention allows a meeting requestor to request that access history of one or more pre-read materials included in a meeting invite message be monitored. As a result, the meeting requestor may know in advance whether or not to cancel or reschedule a meeting based upon a number or percentage of invited attendees that have accessed the pre-read materials. This may help to improve the efficiency and effectiveness of meetings.

It should be noted that although FIG. 1 illustrates a particular number of network elements or devices, such as for example, a client 102, a calendar application server 104, a directory server 114, a repository 112, a document repository server 106, a monitoring agent 108, an email server 110 and one or more clients 116, it should be noted that any number of any one of the illustrated network elements or devices may be deployed. In addition, FIG. 1 has been simplified for illustrative purposes. For example, there may be additional network elements (e.g., a firewall, a border element, a gateway, and the like) or access networks between the illustrated network elements or devices shown in FIG. 1.

Figure 2:
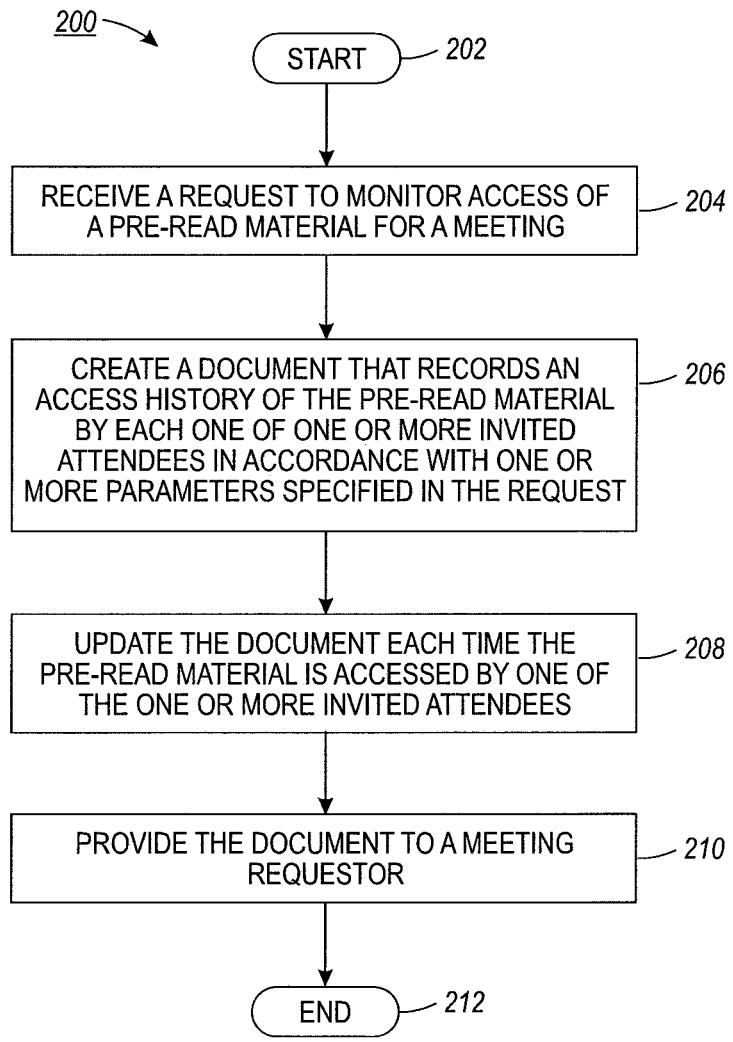
FIG. 2 illustrates an example flowchart of one embodiment of a method for monitoring access of a pre-read material for a meeting.

FIG. 2 illustrates a flowchart of a method 200 for monitoring access of a pre-read material for a meeting. In one embodiment, the method 200 may be performed by the monitoring agent 108 or a general-purpose computer as illustrated in FIG. 5 and discussed below.

The method 200 begins at step 202. At step 204, the method 200 receives a request to monitor access of the pre-read material for the meeting. In one embodiment, the request may be received from a calendar application server or from a client. For example, the client may directly email a monitoring agent on a document repository server to request monitoring access of the pre-read material.

In one embodiment, the pre-read material comprises a plurality of pre-read materials. In one embodiment, the pre-read material may be a document or a link to a document stored in a document repository that is in communication with the document repository server and the monitoring agent. In one embodiment, "access" may be defined as whether or not an invited attendee has opened a pre-read material, printed the pre-read material, edited a pre-read material, downloaded a pre-read material or commented on a pre-read material.

At step 206, the method 200 creates a document that records an access history of the pre-read material by each one of the one or more invited attendees in accordance with one or more parameters specified in the request. In one embodiment, the one or more parameters may be one or more monitoring parameters that are included as part of a meeting invite message that is created by a client. For example, when a meeting requestor uses his or her respective client to schedule a new meeting by creating a meeting invite message, the meeting requestor may specify one or more monitoring parameters.

In one embodiment, the document may be a word processing document, a spreadsheet, a text file, and the like. In one embodiment, the document may record the access history of the pre-read material for each one of the invited attendees. The document may include a list of each one of one or more pre-read materials and each one of the invited attendees. Each time an invited attendee of the invited attendees accesses the pre-read material, the access activity may be recorded in the document. When a time period for monitoring has elapsed, the monitoring information (e.g., a tracking percentage of a particular monitoring parameter or a numerical value of a particular monitoring parameter) may be forwarded to the meeting requestor or the calendar application server. In one embodiment, the document may have a path name or link associated with it such that the meeting requestor may access the document on demand at any time to check on a status of the access history periodically.

In one embodiment, the identity of each one of the invited attendees may be hidden to protect their privacy during the monitoring. For example, the document may be modified when it is sent to the meeting requestor such that only the tracking percentage or tracking value of a particular monitoring parameter is provided without a breakdown by individual invited attendee. In other words, the access history is recorded and provided to the meeting requestor such that each one of the invited attendees remains anonymous.

At step 208, the method 200 updates the document each time the pre-read material is accessed by one of the one or more invited attendees. For example, the monitoring may be performed continuously over a time period specified in the monitoring parameters as defined by the meeting requestor.

At step 210, the method 200 provides the document to a meeting requestor. For example, the document may be sent to the client of the meeting requestor. In one embodiment, the document may be modified before being sent such that the privacy of the one or more invited attendees is protected. For example, all of the names or identities of the invited attendees may be removed from the document before being sent and the document may only include the overall tracking percentages or tracking values of the specified monitoring parameters.

In one embodiment, the document may be provided on demand. In other words, the meeting requestor may request the document at anytime during the monitoring time period. In another embodiment, the document may be provided automatically at specified time intervals or at the end of a monitoring time period as specified in the monitoring parameters of the meeting invite message. The method 200 ends at step 212.

Figure 3:
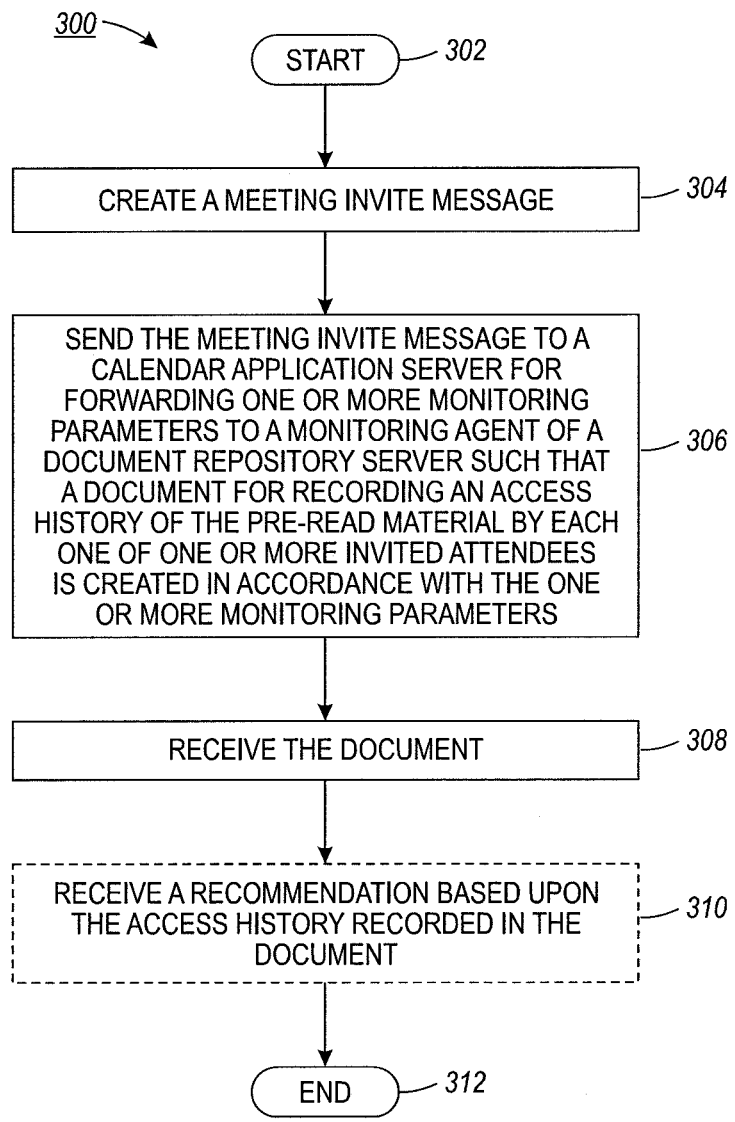
FIG. 3 illustrates another example flowchart of one embodiment of a method for monitoring access of a pre-read material for a meeting.

FIG. 3 illustrates a flowchart of a method 300 for monitoring access of a pre-read material for a meeting. In one embodiment, the method 300 may be performed by the client 102 or a general-purpose computer as illustrated in FIG. 5 and discussed below.

The method 300 begins at step 302. At step 304, the method 300 creates a meeting invite message including one or more meeting request parameters defined by a meeting requestor, wherein the one or more meeting request parameters comprise one or more invited attendees, a date, a time, a pre-read material for the meeting and one or more monitoring parameters for monitoring an access history of the pre-read material by each one of the one or more invited attendees. For example, the date may be a date of when the meeting is scheduled and the time may be the time when the meeting is scheduled. The time may be a time range including a start time and an end time, for example, 4:00 PM to 5:00 PM.

In one embodiment, the pre-read material comprises a plurality of pre-read materials. In one embodiment, the pre-read material may be a document or a link to a document stored in a document repository that is in communication with the document repository server and the monitoring agent. In one embodiment, "access" may be defined as whether or not an invited attendee has opened a pre-read material, printed the pre-read material, edited a pre-read material, downloaded a pre-read material or commented on a pre-read material.

In one embodiment, the monitoring parameters may include tracking a percentage of invited attendees that have accessed the pre-read material. For example, if there are ten invited attendees, the monitoring parameters may track how many of the ten invited attendees have accessed (e.g., opened the document electronically, printed the document, etc.) and report a percentage.

In another embodiment, the monitoring parameters may include tracking a percentage of the invited attendees that have downloaded the pre-read materials, tracking a percentage of the invited attendees that have edited the pre-read material or tracking a percentage of invited attendees that have commented on the pre-read material. The percentages may be calculated as described above for a percentage of invited attendees that have accessed the pre-read material.

In another embodiment, the monitoring parameters may specify how information should be presented to the meeting requestor (e.g., in a bar chart, in a pie chart, in a graphical form, in a spreadsheet form, etc.). The monitoring parameters may also specify a delivery preference for the document or a time period for monitoring. For example, the meeting requestor may specify whether he or she would like to have the information sent via email, text message, and the like. In addition, the meeting requestor may specify a time period when the information should be sent. For example, the meeting requestor may specify updates on a time period basis, e.g., every day, every week, every month and so forth. In one embodiment, the meeting requestor may specify that a final update may be sent the day before the scheduled meeting. The monitoring may be performed continuously during the period from the date the meeting invite message is sent until the day of the scheduled meeting. As a result, the information may be continuously updated for the meeting requestor as the access of the pre-read material is monitored.

In one embodiment, the monitoring parameters may include a threshold. For example, the meeting requestor may require that at least 50% of the invited participants access the pre-read materials otherwise the meeting needs to be rescheduled or canceled.

At step 306, the method 300 sends the meeting invite message to a calendar application server for forwarding the one or more monitoring parameters to a monitoring agent of a document repository server such that a document for recording an access history of the pre-read material by each one of the one or more invited attendees is created in accordance with the one or more monitoring parameters. In another embodiment, the meeting invite message may be sent directly to the monitoring agent of a document repository server via email.

In one embodiment, the document may be a word processing document, a spreadsheet, a text file, and the like. In one embodiment, the document may record the access history of the pre-read material for each one of the invited attendees. The document may include a list of each one of one or more pre-read materials and each one of the invited attendees. Each time an invited attendee of the invited attendees accesses the pre-read material, the document records the access activity. When a time period for monitoring has elapsed, the monitoring information (e.g., a tracking percentage of a particular monitoring parameter or a numerical value of a particular monitoring parameter) may be forwarded to the meeting requestor or the calendar application server. In one embodiment, the document may have a path name or link associated with it such that the meeting requestor may access the document on demand at any time to check on a status of the access history periodically.

In one embodiment, the identity of each one of the invited attendees may be hidden to protect their privacy during the monitoring. For example, the document may be modified when it is sent to the meeting requestor such that only the tracking percentage or tracking value of a particular monitoring parameter is provided without a breakdown by individual invited attendee. In other words, the access history is recorded and provided to the meeting requestor such that each one of the invited attendees remains anonymous.

At step 308, the method 300 receives the document. For example, the document may be received by the client of the meeting requestor. In one embodiment, the document may be modified before being received such that the privacy of the one or more invited attendees is protected. For example, all of the names or identities of the invited attendees may be removed from the document before being received and the document may only include the overall tracking percentages or tracking values of the specified monitoring parameters.

In one embodiment, the document may be received on demand. In other words, the meeting requestor may request the document at anytime during the monitoring time period. In another embodiment, the document may be received automatically at specified time intervals or at the end of a monitoring time period as specified in the monitoring parameters of the meeting invite message.

At optional step 310, the method 300 may receive a recommendation based upon the access history recorded in the document. For example, if a tracking percentage or tracking value of a monitoring parameter is below a threshold of the same monitoring parameter, it may be determined that the meeting should be canceled and/or rescheduled. As a result, the client may receive a recommendation that the meeting be canceled and/or rescheduled. For example, the meeting requestor may see a pop-up message with options for canceling and/or rescheduling the meeting on a computing device executing the client. The method 300 ends at step 312.

Figure 4:
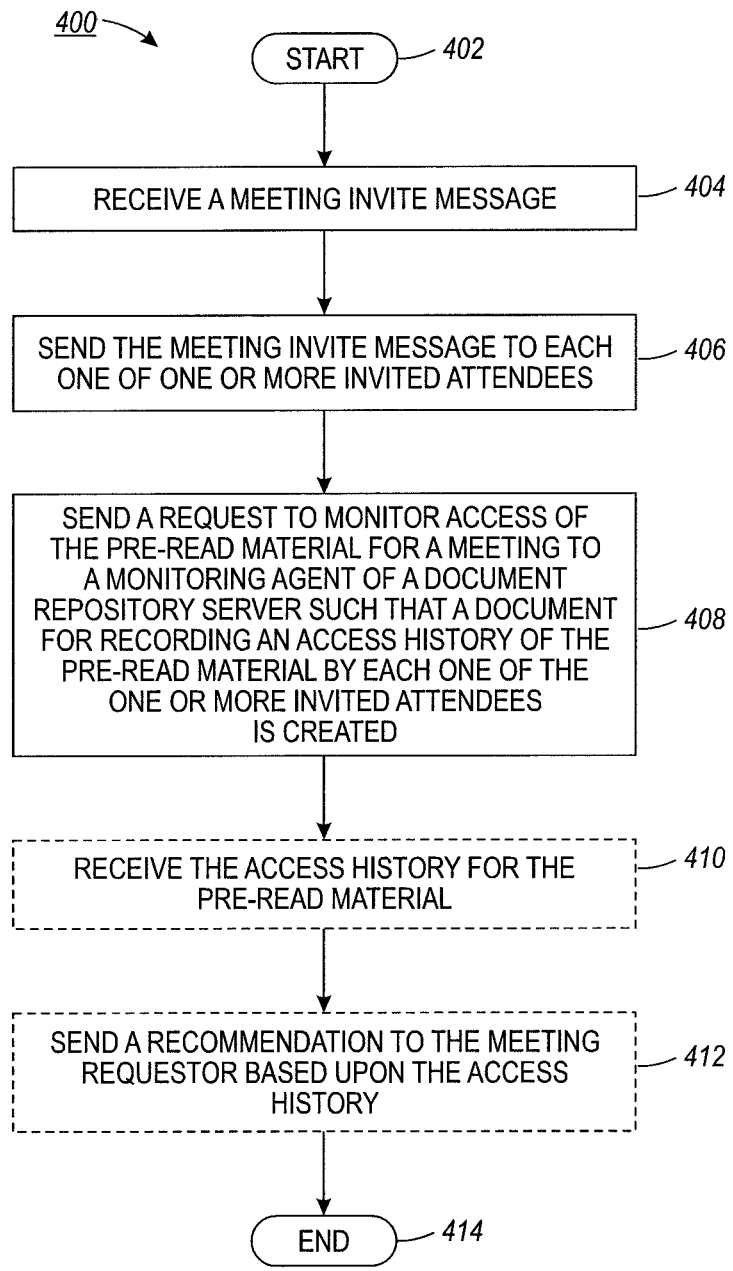
FIG. 4 illustrates yet another example flowchart of one embodiment of a method for monitoring access of a pre-read material for a meeting.

FIG. 4 illustrates a flowchart of a method 400 for monitoring access of a pre-read material for a meeting. In one embodiment, the method 400 may be performed by the calendar application server 104 or a general-purpose computer as illustrated in FIG. 5 and discussed below.

The method 400 begins at step 402. At step 404, the method 400 receives a meeting invite message including one or more meeting request parameters defined by a meeting requestor, wherein the one or more meeting request parameters comprise one or more invited attendees, a date, a time, a pre-read material for the meeting and one or more monitoring parameters for monitoring an access history of the pre-read material by each one of the one or more invited attendees. For example, the date may be a date of when the meeting is scheduled and the time may be the time when the meeting is scheduled. The time may be a time range including a start time and an end time, for example, 4:00 PM to 5:00 PM.

In one embodiment, the pre-read material comprises a plurality of pre-read materials. In one embodiment, the pre-read material may be a document or a link to a document stored in a document repository that is in communication with the document repository server and the monitoring agent. In one embodiment, "access" may be defined as whether or not an invited attendee has opened a pre-read material, printed the pre-read material, edited a pre-read material, downloaded a pre-read material or commented on a pre-read material.

In one embodiment, the monitoring parameters may include tracking a percentage of invited attendees that have accessed the pre-read material. For example, if there are ten invited attendees, the monitoring parameters may track how many of the ten invited attendees have accessed (e.g., opened the document electronically, printed the document, etc.) and report a percentage.

In another embodiment, the monitoring parameters may include tracking a percentage of the invited attendees that have downloaded the pre-read materials, tracking a percentage of the invited attendees that have edited the pre-read material or tracking a percentage of invited attendees that have commented on the pre-read material. The percentages may be calculated as described above for a percentage of invited attendees that have accessed the pre-read material.

In another embodiment, the monitoring parameters may specify how information should be presented to the meeting requestor (e.g., in a bar chart, in a pie chart, in a graphical form, in a spreadsheet form, etc.). The monitoring parameters may also specify a delivery preference for the document or a time period for monitoring. For example, the meeting requestor may specify whether he or she would like to have the information sent via email, text message, and the like. In addition, the meeting requestor may specify a time period when the information should be sent. For example, the meeting requestor may specify updates every day, every week, every month and so forth. In one embodiment, the meeting requestor may specify that a final update may be sent the day before the scheduled meeting. The monitoring may be performed continuously during the period from the date the meeting invite message is sent until the day of the scheduled meeting. As a result, the information may be continuously updated for the meeting requestor as the access of the pre-read material is monitored.

In one embodiment, the monitoring parameters may include a threshold. For example, the meeting requestor may require that at least 50% of the invited participants access the pre-read materials otherwise the meeting needs to be rescheduled or canceled.

At step 406, the method 400 sends the meeting invite message to each one of the one or more invited attendees. For example, the calendar application server may look up or find the email addresses or contact information associated with each one of the invited attendees in a directory server. In one embodiment, the directory server may also look up document repository account names for each one of the one or more invited attendees such that the access to documents in the document repository can be monitored. In one embodiment, the document repository account names may be the email address of the invited attendee. The calendar application server may then send the meeting invite message to a respective client or computing device executing the client of each one of the invited attendees via an email server.

At step 408, the method 400 sends a request to monitor the access of the pre-read material for the meeting to a monitoring agent of a document repository server such that a document for recording an access history of the pre-read material by each one of the one or more invited attendees is created in accordance with the one or more monitoring parameters, wherein the request includes the one or more monitoring parameters. In one embodiment, the meeting invite message from the client may be forwarded to the monitoring agent. Alternatively, the calendar application server may generate a new request including the monitoring request and the one or more monitoring parameters to be sent to the monitoring agent.

At optional step 410, the method 400 may receive the access history for the pre-read materials. In one embodiment, the calendar application server may receive the access history to perform a comparison of the tracking percentages or tracking values for a monitoring parameter against a threshold for the same monitoring parameter.

At optional step 412, the method 400 may send a recommendation to the meeting requestor based upon the access history. For example, if the tracking percentage for a monitoring parameter falls below a threshold for the monitoring parameter, the calendar application server may send the client a recommendation to cancel and/or reschedule the meeting. In other words, a desired amount of invited attendees have not reviewed or accessed the pre-read material and may not be prepared for the meeting. As a result, if the meeting were to continue the meeting may be inefficient or ineffective. The method 400 ends at step 414.

It should be noted that although not explicitly specified, one or more steps, functions, or operations of the methods 200, 300 and 400 described above may include a storing, displaying and/or outputting step as required for a particular application. In other words, any data, records, fields, and/or intermediate results discussed in the methods can be stored, displayed, and/or outputted to another device as required for a particular application. Furthermore, steps, functions, or operations in FIGS. 2-4 that recite a determining operation, or involve a decision, do not necessarily require that both branches of the determining operation be practiced. In other words, one of the branches of the determining operation can be deemed as an optional step.

FIG. 5 depicts a high-level block diagram of a general-purpose computer suitable for use in performing the functions described herein. As depicted in FIG. 5, the system 500 comprises a processor element 502 (e.g., a CPU), a memory 504, e.g., random access memory (RAM) and/or read only memory (ROM), a module 505 for monitoring access of a pre-read material for a meeting, and various input/output devices 506 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present disclosure can be implemented in software and/or in a combination of software and hardware, e.g., using application specific integrated circuits (ASIC), a general purpose computer or any other hardware equivalents, e.g., computer readable instructions pertaining to the method(s) discussed above can be used to configure a hardware processor to perform the steps of the above disclosed methods. In one embodiment, the present module or process 505 for monitoring access of a pre-read material for a meeting can be loaded into memory 504 and executed by processor 502 to implement the functions as discussed above. As such, the present method 505 for monitoring access of a pre-read material for a meeting (including associated data structures) of the present disclosure can be stored on a non-transitory (e.g., physical and tangible) computer readable storage medium, e.g., RAM memory, magnetic or optical drive or diskette and the like. For example, the hardware processor 502 can be programmed or configured with instructions (e.g., computer readable instructions) to perform the steps, functions, or operations of methods 200, 300 or 400.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for monitoring an access of a pre-read material for a meeting, comprising:
    receiving, by a processor, a request to monitor the access of the pre-read material for the meeting;
    creating, by the processor, a document separate from the pre-read material that records an access history of the pre-read material by each one of one or more invited attendees in accordance with a plurality of parameters specified in the request, wherein the plurality of parameters comprise tracking a percentage of the one or more invited attendees that have accessed the pre-read material, how information should be presented to a meeting requestor, a delivery preference for the document and specifying that a final updated invite message is sent a day before the meeting, wherein an identity of each one of the one or more invited attendees is hidden from a meeting requestor when the document is provided to the meeting requestor;
    updating, by the processor, the document each time the pre-read material is accessed by one of the one or more invited attendees;
    sending, by the processor, the percentage of the one or more invited attendees that have accessed the pre-read material to a calendar application server, wherein the percentage of the one or more invited attendees that have accessed the pre-read material is compared to a threshold, wherein an updated invite message is sent by the calendar application server to the one or more invited attendees when the percentage of the one or more invited attendees that have accessed the pre-read material is below the threshold, wherein the updated invite message includes a reminder to review the pre-read material and a notification that the meeting was rescheduled because the percentage of the one or more invited attendees that accessed the pre-read material was below the threshold;
    and
    providing, by the processor, the document to the meeting requestor.

2. The method of claim 1, wherein the pre-read material comprises a document or a link to the document in a meeting invite message created by the meeting requestor.

3. The method of claim 1, wherein the request is received from a calendar application server or a software client.

4. The method of claim 1, wherein the plurality of parameters further comprise: a parameter for tracking a percentage of the one or more invited attendees that have downloaded the pre-read material, a parameter for tracking a percentage of the one or more invited attendees that have edited the pre-read material, a parameter for tracking a percentage of the one or more invited attendees that have commented on the pre-read material, and a parameter for a time period for monitoring.

5. The method of claim 1, wherein the providing comprises delivering the document to the meeting requestor on demand.

6. The method of claim 1, wherein the providing comprises delivering the document to the meeting requestor at a specified date.

7. The method of claim 1, wherein the method is performed by a monitoring agent of a document repository server.

8. A method for monitoring an access of a pre-read material for a meeting, comprising:
    creating, by a processor, a meeting invite message including a plurality of meeting request parameters defined by a meeting requestor, wherein the plurality of meeting request parameters comprise one or more invited attendees, a date, a time, a pre-read material for the meeting and a plurality of monitoring parameters for monitoring an access history of the pre-read material by each one of the one or more invited attendees, wherein the plurality of monitoring parameters comprise tracking a percentage of the one or more invited attendees that have accessed the pre-read material, how information should be presented to a meeting requestor, a delivery preference for the document and specifying that a final updated invite message is sent a day before the meeting;
    sending, by the processor, the meeting invite message to a calendar application server for forwarding the plurality of monitoring parameters to a monitoring agent of a document repository server where a document for recording the access history of the pre-read material by each one of the one or more invited attendees is created in accordance with the plurality of monitoring parameters, wherein the document is separate from the pre-read material, wherein an identity of each one of the one or more invited attendees is hidden from the meeting requestor when the document is provided to the meeting requestor;
    receiving, by the processor, a recommendation that the meeting should be rescheduled based on the percentage of the one or more invited attendees that have accessed the pre-read material being below a threshold;
    causing, by the processor, the calendar application server to send an updated invite message to the one or more invited attendees when the percentage of the one or more invited attendees that have accessed the pre-read material is below the threshold, wherein the updated invite message includes a reminder to review the pre-read material and a notification that the meeting was rescheduled because the percentage of the one or more invited attendees that accessed the pre-read material was below the threshold; and
    receiving, by the processor, the document.

9. The method of claim 8, wherein the pre-read material comprises a document or a link to the document.

10. The method of claim 8, wherein the plurality of monitoring parameters further comprise: a parameter for tracking a percentage of the one or more invited attendees that have downloaded the pre-read material, a parameter for tracking a percentage of the one or more invited attendees that have edited the pre-read material, a parameter for tracking a percentage of the one or more invited attendees that have commented on the pre-read material, and a parameter for a time period for monitoring.

11. The method of claim 8, wherein the receiving comprises receiving the document on demand.

12. The method of claim 8, wherein the receiving comprises receiving the document at a specified date.

13. The method of claim 8, further comprising:
receiving, by the processor, a recommendation based upon the access history recorded in the document.

14. The method of claim 13, wherein the recommendation comprises a recommendation to postpone the meeting if one of the one or more monitoring parameters falls below a threshold.

15. A method for monitoring an access of a pre-read material for a meeting, comprising:
receiving, by a processor, a meeting invite message including a plurality of meeting request parameters defined by a meeting requestor, wherein the plurality of meeting request parameters comprise one or more invited attendees, a date, a time, a pre-read material for the meeting and a plurality of monitoring parameters for monitoring an access history of the pre-read material by each one of the one or more invited attendees, wherein the plurality of monitoring parameters comprise tracking a percentage of the one or more invited attendees that have accessed the pre-read material, how information should be presented to a meeting requestor, a delivery preference for the document and specifying that a final updated invite message is sent a day before the meeting;
sending, by the processor, the meeting invite message to each one of the one or more invited attendees; and
sending, by the processor, a request to monitor the access of the pre-read material for the meeting to a monitoring agent of a document repository server where a document for recording the access history of the pre-read material by each one of the one or more invited attendees is created in accordance with the plurality of monitoring parameters, wherein the request includes the plurality of monitoring parameters, wherein the document is separate from the pre-read material, wherein an identity of each one of the one or more invited attendees is hidden from the meeting requestor when the document is provided to the meeting requestor;
receiving, by the processor, the percentage of the one or more invited attendees that have accessed the pre-read material from the monitoring agent;
comparing, by the processor, the percentage of the one or more invited attendees that have accessed the pre-read material to a threshold;
sending, by the processor, an updated invite message to the one or more invited attendees when the percentage of the one or more invited attendees that have accessed the pre-read material is below the threshold, wherein the updated invite message includes a reminder to review the pre-read material and a notification that the meeting was rescheduled because the percentage of the one or more invited attendees that accessed the pre-read material was below the threshold.

16. The method of claim 15, further comprising:
receiving, by the processor, the access history for the pre-read material;
sending, by the processor, a recommendation to the meeting requestor based upon the access history.

17. The method of claim 15, wherein the plurality of monitoring parameters further comprise: a parameter for tracking a percentage of the one or more invited attendees that have downloaded the pre-read material, a parameter for tracking a percentage of the one or more invited attendees that have edited the pre-read material, a parameter for tracking a percentage of the one or more invited attendees that have commented on the pre-read material, and a parameter for a time period for monitoring.

* * * * *